United States Patent [19]

Krueger et al.

[11] 4,361,628
[45] Nov. 30, 1982

[54] COEXTRUDED FILM OF POLYPROPYLENE, POLYPROPYLENE BLEND, AND NYLON

[75] Inventors: Duane A. Krueger, Neenah; Thomas W. Odorzynski, Green Bay, both of Wis.

[73] Assignee: American Can Company, Greenwich, Conn.

[21] Appl. No.: 236,601

[22] Filed: Feb. 20, 1981

[51] Int. Cl.³ ............................................. B32B 27/08
[52] U.S. Cl. ............................ 428/475.8; 428/476.1; 428/516; 428/520; 428/521; 428/517; 264/184
[58] Field of Search ............... 428/475.8, 476.1, 516, 428/517, 520, 521

[56] References Cited

U.S. PATENT DOCUMENTS

| | | | |
|---|---|---|---|
| 4,087,587 | 5/1978 | Shida et al. | 428/500 |
| 4,190,477 | 2/1980 | Ossian et al. | 428/35 |
| 4,233,367 | 11/1980 | Ticknor et al. | 428/476.3 |

FOREIGN PATENT DOCUMENTS

| | | | |
|---|---|---|---|
| 5093449 | 7/1980 | Japan | 428/516 |
| 5148156 | 11/1980 | Japan | 428/516 |

Primary Examiner—P. Ives
Attorney, Agent, or Firm—Stuart S. Bowie; Thomas D. Wilhelm

[57] ABSTRACT

A novel coextruded plastic film has as an adhesive layer between polypropylene and nylon layers, a blend of polypropylene and a graft copolymer of maleic anhydride onto a polypropylene backbone, the graft copolymer having been produced in a reaction carried out at a temperature of from about 80° C. up to about 10° C. below the melting point of the polypropylene.

4 Claims, 2 Drawing Figures

COEXTRUDED FILM OF POLYPROPYLENE, POLYPROPYLENE BLEND, AND NYLON

BACKGROUND OF THE INVENTION

This invention pertains to coextruded plastic films, and particularly, to those films having a polypropylene layer adhered to a layer of a nylon-type polyamide. In such films, the adhesion between the nylon and polypropylene layers has been particularly troublesome. It has been surprisingly found that an excellent adhesive for the coextrusion of nylon and polypropylene is a blend of a graft copolymer of maleic anhydride onto a polypropylene backbone and an ungrafted polypropylene, the graft copolymer having been produced in a reaction carried out at a temperature of from about 80° Celsius up to about 10° Celsius below the melting point of the polypropylene, the graft copolymer containing from about 0.10% to about 2.5% maleic anhydride based on the total weight of the graft copolymer, the graft copolymer comprising between about 5% and about 30% by weight of the blend.

The graft copolymer reaction preferably took place in the presence of an organic peroxide. The polypropylene layer may contain up to about 4% polymeric ethylene.

In the coextrusion of a 5-layer film, the structure includes a fourth layer, of ethylene vinyl alcohol copolymer (EVOH), affixed on one of its surfaces to the nylon, and a fifth layer, of nylon, affixed to the other surface of the EVOH.

Thus the process comprises coextruding polypropylene, and nylon with the adhesive blend juxtaposed therebetween. In the formation of a five layer structure containing EVOH, the process comprises coextruding the five layer structure of, in sequential order in the structural layering, from one outside surface to the other: polypropylene, adhesive blend, nylon, EVOH, and nylon.

DETAILED DESCRIPTION OF THE INVENTION

Figure 1:
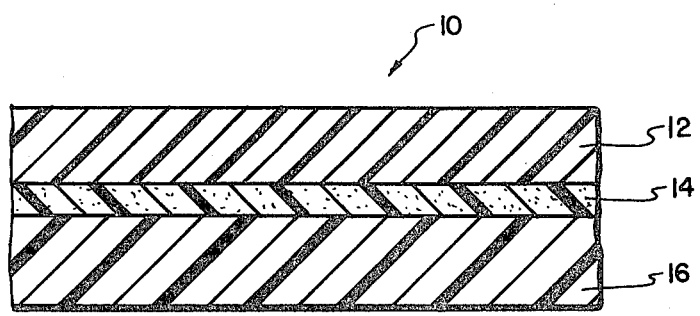
FIG. 1 is a cross-section of a three layer coextruded structure of this invention.

The most basic form of the invention is shown in the coextruded structure of FIG. 1, which is generally designated 10. The structure has three layers which are, respectively, a polypropylene layer 12, an adhesive blend layer of a maleic anhydride graft copolymer of polypropylene and an ungrafted polypropylene 14, and a nylon layer 16.

Layer 12 may be a polypropylene homopolymer, a propylene ethylene copolymer, or a blend of polypropylene and polyethylene. In any event, the maximum acceptable ethylene content is about 20% by weight of the layer 12 composition. The polymer resin, or blends of resin, must, of course, be extrudable polymers. A preferred polymer for layer 12 is sold under the tradename of Hercules SA-752, which also contains about 4% ethylene. Another suitable polymer is Eastman 4G7DP, which contains small amounts of ethylene vinyl acetate.

Layer 16 is a polymer, copolymer, or blend thereof selected from the nylon family of polyamides. Very desirable polymeric compositions for layer 16 are nylon 6, nylon 6,6, nylon 6, 6, 6, blends of nylon 6 with less than 25% nylon 12, blends of at least about 75% nylon 6 with any other polymer composition processable with nylon 6. Examples of materials which can be processed with nylon 6 as a blend are high density polyethylene, medium density polyethylene, low density polyethylene and polypropylene. In general, any extrudable polymer may be satisfactorily used so long as it neither degrades at the processing temperature of about 500° F. to about 530° F., nor reacts appreciably with the nylon 6.

Less desirable, but acceptable, are copolymers of nylon 6 and nylon 12. Unacceptable for layer 16 is nylon 12.

Processing additives such as slip agents and the like may be satisfactorily used.

Layer 14 serves as a coextruded adhesive layer between layers 12 and 16. It forms an inseparable bond with layer 12, and has good adhesion to layer 16. Layer 14 is a blend of two components: (1) a grafted copolymer of polypropylene and maleic anhydride and (2) an ungrafted polypropylene. The ungrafted polypropylene component (2) may be a polypropylene homopolymer, a propylene ethylene copolymer, or a blend of polypropylene and polyethylene. In any event, the maximum acceptable ethylene content is about 20% by weight of the ungrafted polypropylene component (2) of the blend.

The grafted copolymer component (1) of the blend is a copolymer produced in a reaction carried out at a temperature of from about 80° C. up to about 10° C. below the melting point of the polypropylene, as taught in U.S. Pat. No. 3,414,551. In the reaction, crystalline polypropylene in particulate form is agitated in contact with maleic anhydride and an organic peroxygen compound in an atmosphere of inert gas and in the absence of a solvent. At the conclusion of the reaction the product is washed with water or other liquid. For use in this invention, the graft copolymer component of the blend should contain from 0.1% to 2.5% maleic anhydride based on the total weight of the graft copolymer. A graft copolymer suitable for use in this invention as component (1) of the blend is sold by Hercules Chemical Company as Hercoprime A-35.

The blend for coextrusion as layer 14 in the coextruded structure is from about 5% to about 30% by weight of the maleic anhydride grafted copolymer, and preferably about 5% to about 10%, and from about 70% to about 95% of the ungrafted polypropylene, preferably about 90% to about 95%. Thus the overall maleic anhydride concentration in the blend layer 14, based on the entire blend composition, is from about 0.005% to about 0.75%, with a preferred maleic anhydride concentration range of about 0.005% to about 0.25%.

In the preferred extrusion process the components of the individual layers are fed into the infeed hoppers of extruders of like number, each extruder handling the material for one of the layers. As in the case of the five layer structure, illustrated, where two layers are identical, one extruder may handle the two identical layers. The melted and plasticated streams from the individual extruders are fed into a multiple manifold coextrusion die. The layers are juxtaposed and combined in the die, and exit the die as a single multiple layer film of polymeric material.

After exiting the die, the polymeric material is cast onto a first controlled temperature roll, passes around the first roll, and thence onto a second controlled temperature roll, which is normally cooler than the first roll. The controlled temperature rolls largely control the rate of cooling of the film after it exits the die. Typical operating temperatures for the first and second controlled temperature rolls are 160° F. and 120° F. respectively.

Figure 2:
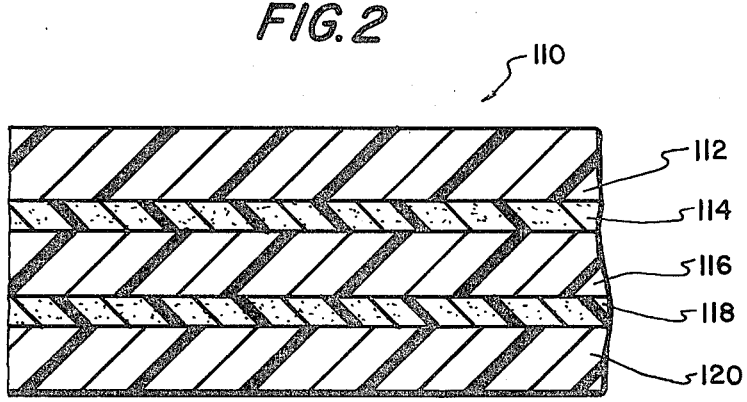
FIG. 2 is a cross-section of a five layer coextruded structure of this invention.

In another embodiment of the invention illustrated in FIG. 2, a five-layer structure is coextruded, wherein similar 100 series numbers represent similar layers in FIG. 1. Thus the entire structure is generally designated 110. Layers 112, 114, and 116 have the same compositions, and serve the same functions as layers 12, 14, and 16 respectively in FIG. 1. Layer 118 is a high gas barrier material such as EVOH. Layer 120 is a layer of nylon, and may be any nylon which may be coextruded with the gas barrier material.

EXAMPLE 1

Five parts by weight of Hercoprime A-35 particles were blended with 95 parts of weight of pelletized Hercules SA-752 ungrafted polypropylene polymer to form the adhesive blend composition. A three layer film was cast coextruded through a 3-manifold cast die fed by three extruders processing, respectively, nylon 6, the above recited blend, and Hercules SA-752 polypropylene. Die temperature was 500° F. Line speed was 60 feet per minute. The film was cast onto a first controlled temperature chill roll maintained at 160° F., and passed from there onto a second chill roll at 120° F. The final film was 4.5 mils thick. The outer layers were 3.5 mils SA-752 polypropylene and 0.5 mil nylon, with a 0.5 mil layer of the blend serving as the adhesive layer between them.

EXAMPLE 2

A three layer 4.5 mil film was cast coextruded as in Example 1, using as the nylon layer a blend of 75% Nylon 6 and 25% Nylon 12.

EXAMPLE 3

A three layer, 4.5 mil, film was cast coextruded as in Example 1, using as the adhesive blend a composition of 10 parts by weight Hercoprime A-35 and 90 parts by weight SA-752.

EXAMPLE 4

A three layer, 4.5 mil, film was cast coextruded as in Example 2, using as the adhesive blend a composition of 10 parts by weight Hercoprime A-35 and 90 parts by weight SA-752.

EXAMPLE 5

Five parts by weight of Hercoprime A-35 particles were blended with 95 parts by weight of pelletized Hercules SA-752 polypropylene to form the adhesive blend composition. Using four extruders, a 3-manifold cast die, and a combining head, a five layer film was cast coextruded. One extruder fed an SA-752 polypropylene stream into the die. Another extruder fed a stream of the adhesive blend into the die. The third stream was generated by two extruders feeding the nylon and EVOH into the combining head. In the combining head, the extrudates from the two extruders were combined into a three-layer stream having nylon on its outer portions and a core layer of EVOH. Combining head temperature was 500° F. The three-layer stream was fed from the combining adaptor into the 3-manifold die, where it was juxtaposed, and finally, joined with the adhesive blend layer. Die temperature was 500° F. The final five-layer film was cast onto a first controlled temperature chill roll maintained at 160° F., and passed from there onto a second chill roll at 120° F. Line speed was 60 feet per minute. The final film was 5 mils thick and had the following distinct layers, in order:

| | |
|---|---|
| polypropylene | 3.5 mils |
| adhesive blend | 0.5 mil |
| Nylon 6 | 0.25 mil |
| EVOH | 0.5 mil |
| Nylon 6 | 0.25 mil |

EXAMPLE 6

A five-layer, 5 mil, film was cast coextruded as in Example 5, using, as the nylon layers, a blend of 75% Nylon 6 and 25% Nylon 12.

EXAMPLE 7

A five-layer, 5 mil, film was cast coextruded as in Example 5, using as the adhesive blend a composition of 10 parts by weight Hercoprime A-35 and 90 parts by weight SA-752.

EXAMPLE 8

A five-layer, 5 mil, film was cast coextruded as in Example 6, using as the adhesive blend a composition of 10 parts by weight Hercoprime A-35 and 90 parts by weight SA-752.

The adhesive bond between layers 14 and 16 was measured as peel strength in pounds per one inch width strip of specimen. In preparation for the peel test, specimens were cut into one inch strips. They were then tested in a Chatillon tester, manufactured by John Chatillon and Sons, New York. Crossing head speed was 10 inches per minute. The resulting peel strengths of all the samples were 2 lbs./in. width, with a range of 1.8 to 2.1 lb./in. width.

What is claimed is:

1. A coextruded multiple layer plastic film comprising, in sequential order of layering:
    (a) polypropylene;
    (b) a functionally adhesive blend of a graft copolymer of maleic anhydride onto a polypropylene backbone and an ungrafted polypropylene, said graft copolymer having been produced in a reaction carried out at a temperature of from about 80° Celsius up to about 10° Celsius below the melting point of the polypropylene, said graft copolymer containing from about 0.5% to 5% maleic anhydride based on the total weight of the graft copolymer, said graft copolymer comprising between about 5% and 30% by weight of the blend, and said ungrafted polypropylene comprising between about 70% and 95% by weight of the blend; and
    (c) nylon.

2. A plastic film as in claim 1 wherein the polypropylene layer in subparagraph (a) contains up to about 20% polymeric ethylene.

3. A plastic film as in claim 1 or 2, said graft copolymer reaction having taken place in the presence of an organic peroxide.

4. A plastic film as in claim 1 or 2 and including an additional layer of ethylene vinyl alcohol copolymer affixed on one of its surfaces to said nylon, and a further layer of nylon affixed to the other surface of said ethylene vinyl alcohol copolymer.

* * * * *